March 9, 1965  B. B. BELDEN  3,172,156
COMPACTING PRESS
Filed Sept. 6, 1962  8 Sheets-Sheet 1

Fig. 1

INVENTOR.
BYRON B. BELDEN,
BY
ATTORNEYS.

Fig. 1a

March 9, 1965 B. B. BELDEN 3,172,156
COMPACTING PRESS
Filed Sept. 6, 1962 8 Sheets-Sheet 3

INVENTOR.
BYRON B. BELDEN,
BY
ATTORNEYS.

March 9, 1965   B. B. BELDEN   3,172,156
COMPACTING PRESS

Filed Sept. 6, 1962   8 Sheets-Sheet 4

Fig.2a

INVENTOR.
BYRON B. BELDEN,
BY
ATTORNEYS.

March 9, 1965 B. B. BELDEN 3,172,156
COMPACTING PRESS
Filed Sept. 6, 1962 8 Sheets-Sheet 5

Fig. 4

INVENTOR.
BYRON B. BELDEN
BY
ATTORNEYS

March 9, 1965 B. B. BELDEN 3,172,156
COMPACTING PRESS
Filed Sept. 6, 1962 8 Sheets-Sheet 6

INVENTOR.
BYRON B. BELDEN,
BY
ATTORNEYS.

INVENTOR.
BYRON B. BELDEN

ATTORNEYS

March 9, 1965    B. B. BELDEN    3,172,156
COMPACTING PRESS

Filed Sept. 6, 1962    8 Sheets-Sheet 8

INVENTOR.
BYRON B. BELDEN
BY
ATTORNEYS

United States Patent Office 3,172,156
Patented Mar. 9, 1965

3,172,156
COMPACTING PRESS
Byron B. Belden, Hamilton, Ohio, assignor to The Cincinnati Shaper Company, Cincinnati, Ohio, a corporation of Ohio
Filed Sept. 6, 1962, Ser. No. 221,840
8 Claims. (Cl. 18—16.7)

This invention relates to a compacting press and specifically to a press for compacting a powdered or comminuted material such as powdered iron or steel or other alloy, ferrites, ceramics, abrasives, solid fuels, nuclear fuels and the like, into a compact self-sustaining article.

Compacting presses as such as well known and in general they include a die and some sort of a fixed bottom element therefore into which the powdered metal is fed. A ram or punch then compacts the powdered metal in the die under very high pressures which may be as high as 50 tons per square inch or more. After the material has been compacted in the die, the article is ejected from the die in one of several ways and the completed article is then ready for subsequent treatment of any desired type.

When such compacting presses are used to make complex articles, that is, articles having a stepped configuration, the operation of ejecting the workpiece from the die becomes correspondingly more difficult. Thus, for example, if a workpiece in the form of a tubular sleeve or the like having a relatively thin flange at one end is to be ejected, there is great danger of cracking or breaking the flange in the ejection process. The reason for this is that there is substantial frictional resistance to the removal of the workpiece from the die and if the flange is not supported during the ejection process the flange is likely to break.

Likewise, during the compacting process as the compacting operation proceeds there is increasingly greater friction between the material being compacted and the walls of the die which tends to prevent homogeneous compacting of the powdered material.

With these and other difficulties in mind, it is an object of the present invention to provide a compacting press in which the foregoing problems are overcome. It is among other things an object of the invention to provide a multi-platen press in which each platen will hold a die providing for one of several different diameters to be produced in the final workpiece and to provide a floating mounting for the several platens, so that as the compacting operation proceeds the frictional resistance of the walls of the die to the compacted material causes the die to float downwardly during the compacting stroke, thus ensuring a homogeneous compact.

It is yet another object of the invention to provide a compacting press wherein the ejection process is carried out by forcing the die downwardly in sequence with the die for the uppermost step being forced downwardly first so as to eject the uppermost portion of the article while that step is still supported by the upper surface of the next lower die.

Still another object of the invention involves the provision of means whereby each succeeding lower die is released from its step when the upper surface of the upper die is flush with the upper surface of the next lower die, so that the two dies may then be forced down together while a still lower diameter is supported from below.

These and other objects of the invention which will be described in more detail hereinafter or which will become apparent to one skilled in the art upon reading the specifications, I accomplish by that certain construction and arrangement of parts of which I shall now described an exemplary embodiment.

Reference is made to the drawings forming a part hereof and in which.

Briefly, in the practice of the invention there is provided a press having several platens floatingly mounted in the frame of the press. An upper reciprocating punch and a lower fixed punch are provided in axial alignment with means for moving the upper punch downwardly in a compacting stroke. Each of the platens supports a die and these dies are arranged in telescoping relationship. When the three dies are so arranged in telescoping relationship, the interior of these dies will provide for portions of different diameters axially of the workpiece and the arrangement is such that the uppermost diameter is provided in the die in the uppermost platen, the next lower diameter in the next lower platen and so on. A core punch may be provided in the fixed punch at the bottom of the machine where it is desired to produce a tubular workpiece.

By virtue of the floating mounting of the die platen, as the material in the several dies is being compacted by the pressure of the reciprocating punch against the fixed punch, the friction between the material being compacted and the side walls of the respective dies, causes these dies to float downwardly during the compacting stroke. Stop means are provided for all but the uppermost of the platens and these stop means are of such strength and rigidity that they can withstand the full load of the press. When the reciprocating punch reaches the end of its compacting stroke, means are provided to force the uppermost platen downwardly while the lower platens are held rigidly by their respective stop means. This action ejects the uppermost or larger diameter of the workpiece from the uppermost die. Means are provided which operate when the upper surface of the uppermost die is substantially flush with the upper surface of the next lower die to release these stop means for the next lower die so that the uppermost and next lower die may be forced downwardly together. This action proceeds in the same manner with all lower dies until the workpiece is completely ejected so that during the ejection of each diameter of the workpiece, that particular diameter is supported by the upper surface of the next lower die respectively.

Referring now in more detail to the drawings, the press comprises a frame 10 and an upper casing 11 which houses the drive motor and eccentric mechanism for the punch and the cam mechanism for the downward movement of the platens during ejection. This mechanism in general is conventional and will not be described in detail. A box 12 mounted on the side of the apparatus houses various control apparatus which does not form a part of the present invention. The upper die platen is indicated at 13, the intermediate die platen at 14 and the lower die platen at 15. It will be understood that for purposes of illustration a three platen press has been chosen but it will be clear that the principles herein disclosed apply to a press having any desired number of platens, either greater or less than three. The reciprocating punch is indicated at 16 and is provided with suitable mechanism for moving it downwardly under heavy pressure and this of course may be accomplished by means of a drive shaft having an eccentric or by hydraulic or other suitable means (not shown). The fixed lower punch is indicated at 17. A core punch 18 may be axially mounted within the fixed punch 17 and the punch 18 may be hydraulically actuated as for example by means of a piston 19 operating in a cylinder 20 and subjected to hydraulic pressure. The platens 14 and 15 are floatingly mounted on the heavy guide rods 21 and they may be supported by pneumatic or hydraulic pressure in known manner. The uppermost die platen 13 is floatingly supported on the rods 22.

Figure 1:
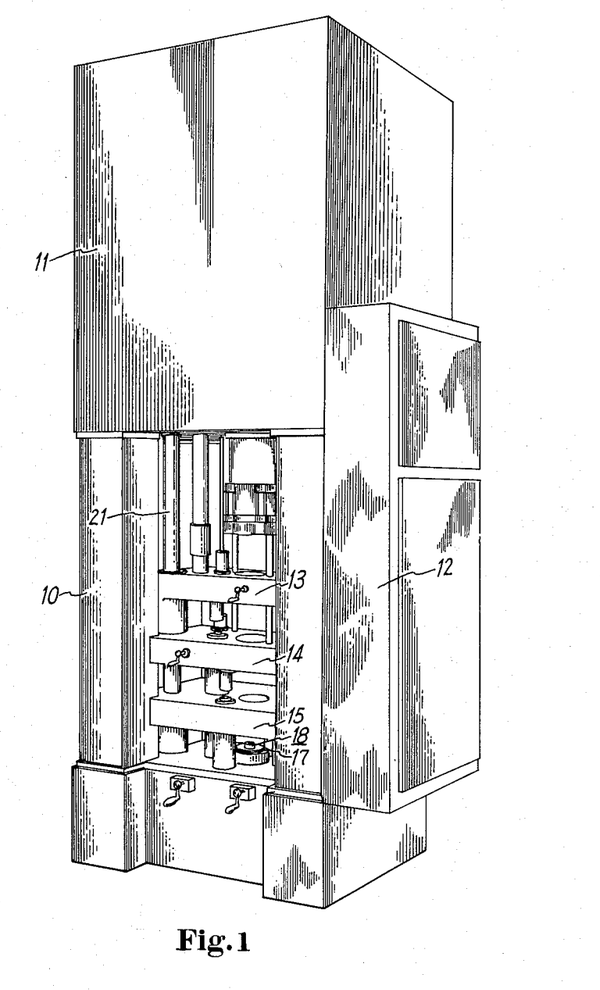
FIG. 1 is a general perspective view of the machine according to the invention as seen from the front.
Figure 1A:
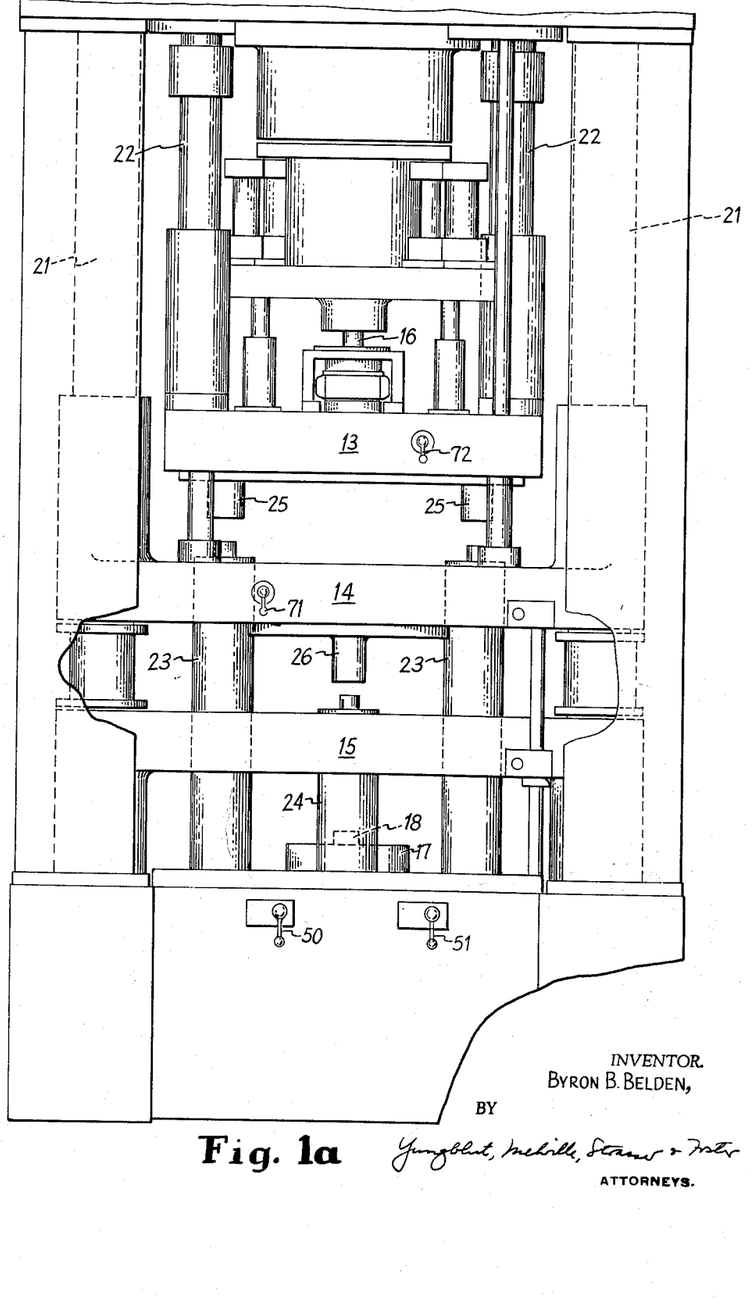
FIG. 1a is an enlarged view in front elevation of the lower part of the machine with parts broken away for clarity.

Stop means are provided for the platens 14 and 15, these platens being strong enough and rigid enough to withstand the entire load of the press, and means are provided for releasing these stop means at the proper time. In FIG. 1a the stop rods for the platen 14 are indicated at 23 and the stop rods for the platen 15 are indicated at 24. It will be understood that there are two stop rods 24 diametrically disposed about the axis of the machine just as there are two stop rods 23 diametrically disposed. Preferably the diameter on which the stop rods 24 are disposed is 90° from the diameter on which the stop rods 23 are disposed. The stop rods 23 are released by means of the members 25 secured to the platen 13 as will be described in more detail hereinafter, and the stop rods 24 are released by the members 26 which are attached to the platen 14.

Figure 3:
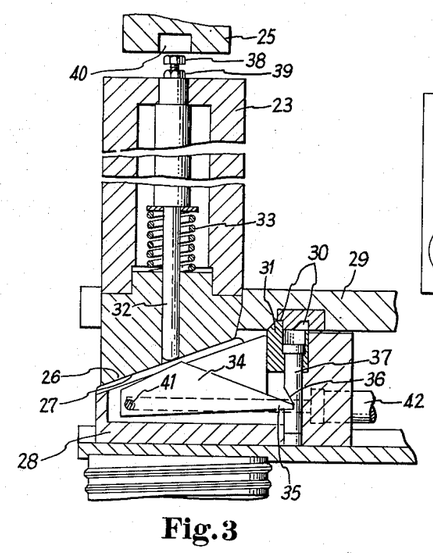
FIG. 3 is a fragmentary cross-sectional view taken on the line 3—3 of FIG. 2.

Referring now to FIG. 3, which shows in detail one of the stop mechanisms and the means for releasing it, there is shown the stop rod 23 and the ejection rod 25 which actuates it. The stop and release mechanism is the subject of a copending application, Serial No. 221,841, filed September 6, 1962, entitled "Releasable Stop Device for Presses and the Like," now Patent No. 3,132,378, issued May 12, 1964, in the name of Jerome Paul Johannigman, in which the structure is disclosed in more detail and wherein the details thereof are claimed. It will be understood that only so much of this mechanism is described as is necessary to an understanding of the present invention.

Referring again to FIG. 3, it will be observed that the lower end of the stop rod 23 has a sloping surface 26 which bears against a sloping surface 27 of a wedge block generally indicated at 28. The wedge block is rigidly mounted in a portion of the frame of the apparatus 29 and is arranged to slide toward the right when the stop is released. In the frame member 29 are the tooth members 30 in which a tooth block 31 slidingly mounted in the wedge block 28 engage. When the teeth on the block 31 are in engagement with the teeth 30, the block is held against lateral movement and this structure is rigid enough to support the entire load of the press.

Mounted in the stop block 23 is a trigger 32 which is normally held in inoperative position by a compression spring 33. Pivotally mounted in the wedge block 28 is a lever 34 having a finger 35 which engages in a notch 36 in a pull rod 37. The pull rod 37 is secured to the tooth block 31. At the top of the trigger member 32 there is a bolt 38 which may be adjusted and fixed in position by means of the lock nut 39, and the ejection rod 25 has a recess 40. The position of the bolt 38 is adjusted so that the bottom of the recess 40 will abut the bolt 38 about one-sixteenth of an inch before the surface of the ejection rod 25 touches the upper surface of the stop rod 23. It must be borne in mind at this point that the member 25 is being forced downwardly and represents the full load of the press.

When the trigger 32 is actuated and pushed downwardly slightly, its lower end actuates the lever 34 which is pivoted at 41 and rocks it slightly in a clockwise direction whereby the finger 35 pulling down on the member 37 withdraws the tooth block 31 from the teeth 30, so that when the member 25 under the full load of the press abuts the member 23 and the member 23 is forced downwardly under the full load of the press, the wedge block 28 is cammed toward the right. The wedge block 28 is connected to the piston rod 42 at the other end of which there is provided a piston in a pneumatic cylinder, so that as the wedge block is cammed to the right the fluid in the cylinder is compressed. When the member 23 returns to its position shown in FIG. 3, this compressed fluid returns the wedge block back to the position of FIG. 3 for a succeeding operation. The details of this mechanism are described in the copending application above referred to.

While the ejection rod 25 and stop rod 23 have been described in detail, it will be understood that the mechanism for the ejection rod 26 and stop rod 24 is identical thereto.

From the foregoing description, it will be understood that it is the downward movement of the platen 13 which brings about a release of the stop rods for the platen 14 so that the two may then move downwardly together and that it is the action of the platen 14 which brings about the release of the stops for the platen 15 so that all three platens may then move downwardly together.

Figure 2:
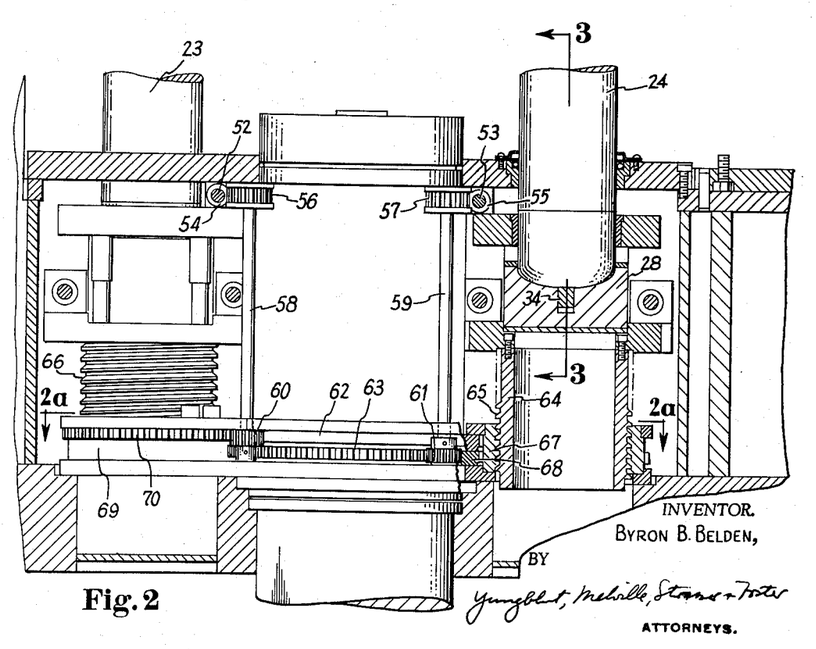
FIG. 2 is a fragmentary cross-sectional view taken on the line 2—2 of FIG. 2b.
Figure 2A:
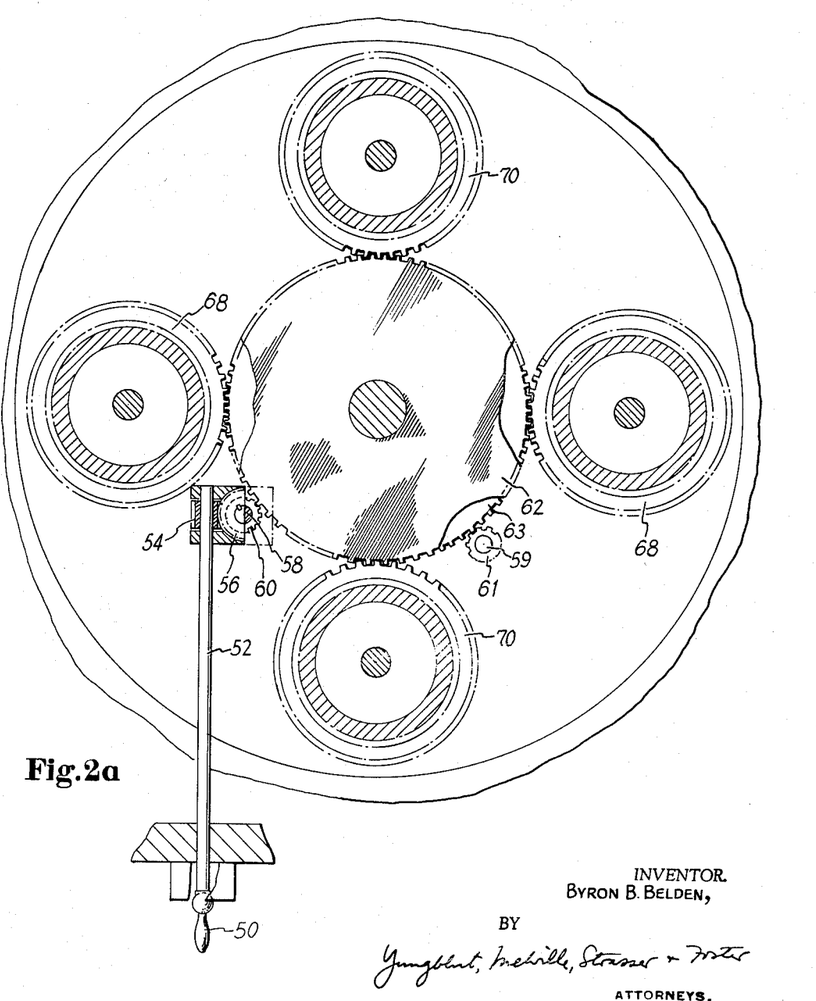
FIG. 2a is a cross-sectional view taken on the line 2a—2a of FIG. 2.
Figure 2B:
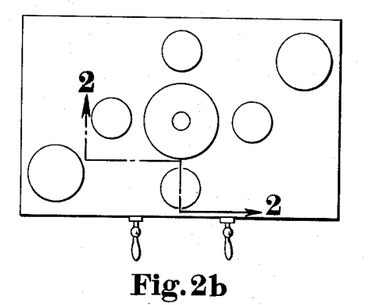
FIG. 2b is a diagrammatic view simply to indicate the section line 2—2.

In order that the spacing between the platens, and therefore between the dies contained therein, may be adjusted for the production of articles of specific configurations, hand wheels or cranks are provided at the front of the apparatus by means of which these adjustments can be made. The position of the stop rods 23 and 24 are adjusted by means of cranks 50 and 51 at the front of the apparatus. The cranks 50 and 51 are mounted respectively on the shafts 52 and 53 (FIG. 2). At their inner ends these shafts carry respectively the worms 54 and 55 and these worms engage the worm wheels 56 and 57 mounted respectively on the shafts 58 and 59. The shafts 58 and 59 are vertically disposed and at the lower end of the shaft 58 there is carried the pinion 60 and at the lower end of the shaft 59 there is the pinion 61. It will be observed that the pinions 60 and 61 are not in the same horizontal plane. Centrally of the apparatus are mounted the two ring gears 62 and 63 and the pinion 60 engages the ring gear 62 while the pinion 61 engages the ring gear 63.

The support for the wedge blocks 28 carries a sleeve 64 which is externally threaded as at 65. A similar sleeve having the external threads 66 is provided for each of the stop rods 23. The threads 65 of the sleeve 64 are engaged by an internally threaded nut 67 which is provided with the external teeth 68 which mesh with the teeth on the ring gear 63. The nut 67 is of course prevented from axial movement in well known manner. Similarly, the nut 69 for the stop rod 23 is provided with the external teeth 70 which mesh with the ring gear 62.

From the foregoing description, it will be clear that as the crank 50 is rotated this rotation is transmitted through the shaft 52 to the worm 54 and thence through the worm wheel 56, shaft 58 and pinion 60 to the ring gear 62 which in turn rotates the sleeve 69 (and of course the diametrically opposite one) whereby the wedge blocks associated with the stop rods 23 may be moved up and down. Similarly, rotation of the crank 51 is transmitted through the shaft 53, the worm 55, the worm wheel 57, the shaft 59 and the pinion 61 to the ring gear 63 and thence to the nut 67 so that rotation of the nut 67 causes the sleeve 64 to move up and down (and of course the diametrically opposite and corresponding one also).

Figure 4:
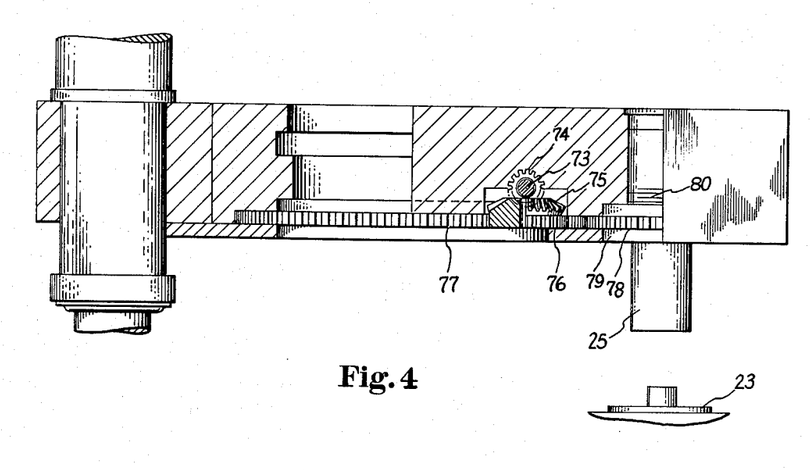
FIG. 4 is a fragmentary cross-sectional view through the uppermost platen.

The crank 71 is provided for adjustment of the axial position for the ejection rods 26 and the crank 72 similarly provides for adjustment of the ejection rods 25. The mechanism whereby this is accomplished is shown in FIG. 4 wherein it is clear that the crank 72 is mounted on a shaft 73 carrying a bevel pinion 74 which meshes with a bevel pinion 75 coaxial with a pinion 76. The pinion 76 meshes with a ring gear 77 and the ring gear 77 meshes with the gears 78 (one for each of the ejection rods 25). The pinion 78 is formed by external teeth on a nut 79 which is internally threaded and meshes with threads 80 forming a part of the ejection rods. It will therefore be clear that as the crank 72 is turned the two diametrically opposed ejection rods 25 are raised or lowered concurrently. The gear train for operating the ejection rods 26 by means of the crank 71 are in all respects similar.

Reference is now made to FIGS. 5 to 14 inclusive for a description of the sequence of the operations in the compacting of a workpiece having portions with three different diameters and also having a core with two different diameters.

Figure 5:
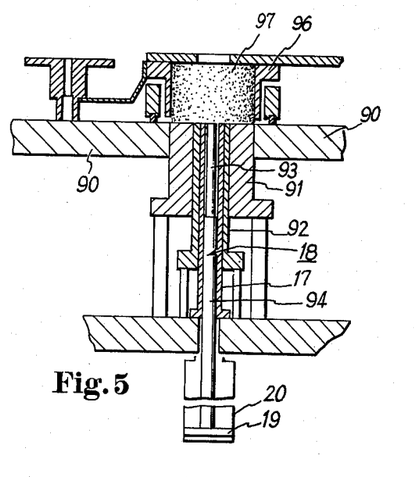
FIGS. 5 to 14 inclusive are more or less diagrammatic representations showing the operation of compacting with the dies closing downwardly and the succeeding ejection of an exemplary workpiece.
Figure 6:
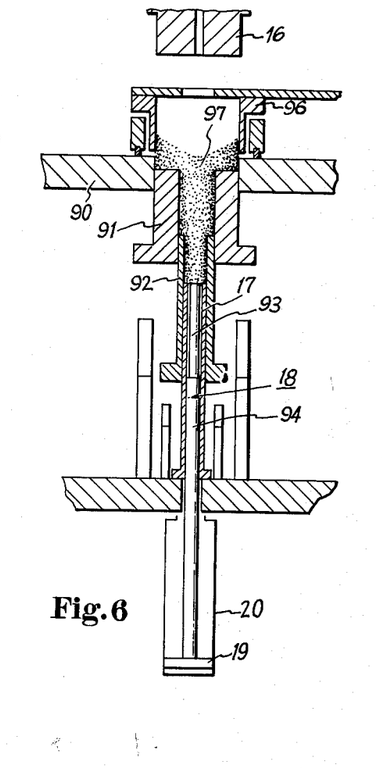
Figure 7:
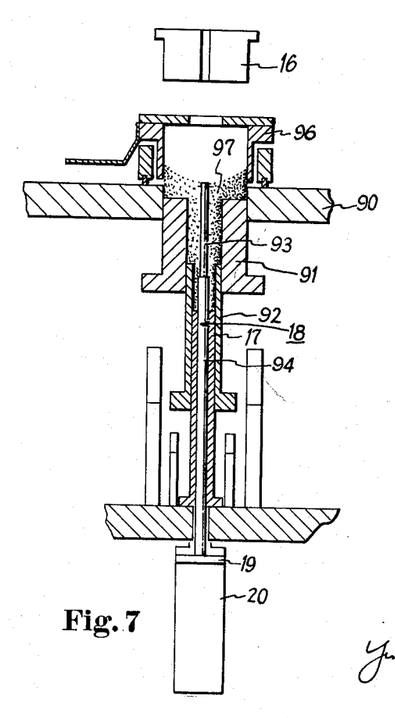

In these figures, the die in the upper platen is indicated at 90, the die in the intermediate platen at 91 and the die in the lower platen at 92. The fixed bottom punch is indicated at 17, and the core punch at 18. The core punch may have portions 93, 94 of different diameters if it is desired to produce a stepped bore. In FIG. 5 a feed hopper generally indicated at 96 is in position over the uppermost die 90 and is filled with material 97 to be compacted. It will be observed that in this figure, the upper surfaces of the dies 90, 91 and 92 and the fixed punch 17 as well as the core punch 18 are substantially flush or in a common plane. As the various die platens move back upwardly after the completion of the compacting operation, the several dies separate in accordance with the adjustment made to them as described hereinabove to provide the stepped configuration for the workpiece to be produced. During this telescoping apart of the dies, the powdered material 97 falls downwardly into the cavity thus produced until finally the situation is as depicted in FIG. 7 with the powdered material 97 loosely filling the die cavity and the upper punch which is reciprocable and which is indicated at 16 is ready to begin its work. At this point also, and before the compacting is carried out, the core punch 18 moves upwardly and in this particular instance it has been shown as having the portion 93 of reduced diameter and the portion 94 of larger diameter so as to produce a stepped configuration for the internal bore of the workpiece.

Figure 8:
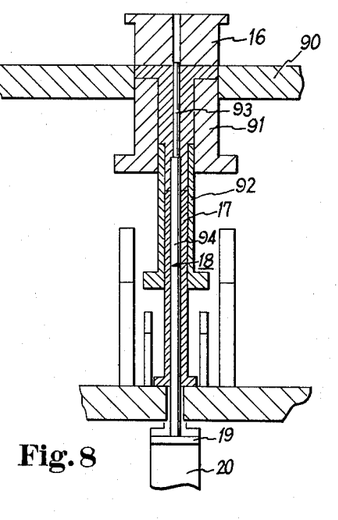
Figure 9:
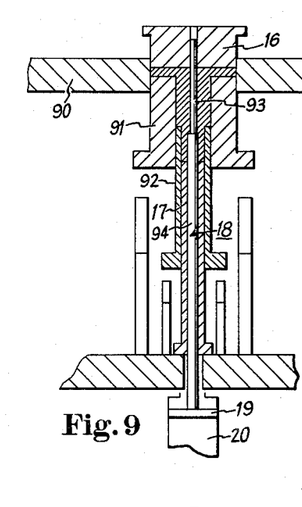
Figure 10:
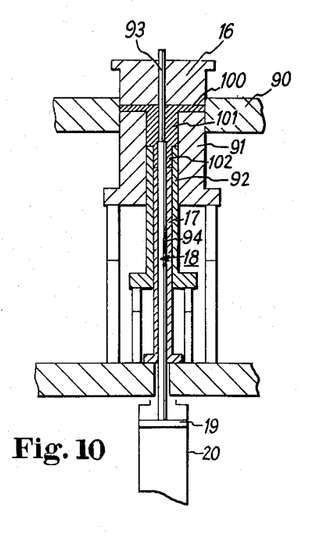
Figure 11:
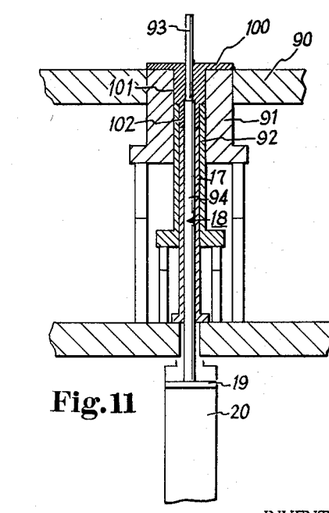

At this point, the compacting operation is ready to start. As shown in FIG. 8, the punch 16 begins to descend and it continues to descend as shown in FIGS. 9 and 10. At it descends, the material being compacted becomes more and more dense and exerts friction against the internal surfaces of the respective dies 90, 91 and 92 and these dies are dragged down or float downwardly with the material being compacted, as can be clearly seen in FIGS. 9 and 10, until the material is fully compacted as shown in FIG. 10. At this point then the upper punch 16 retracts and the ejection process begins. The uppermost platen with the die 90 is forced downwardly by means of a cam arrangement on the drive shaft of the machine (not shown) to eject the uper flange 100 of the workpiece from the die 90. During the time that the flange 100 is being ejected, this flange is supported from beneath by the die 91.

Figure 12:
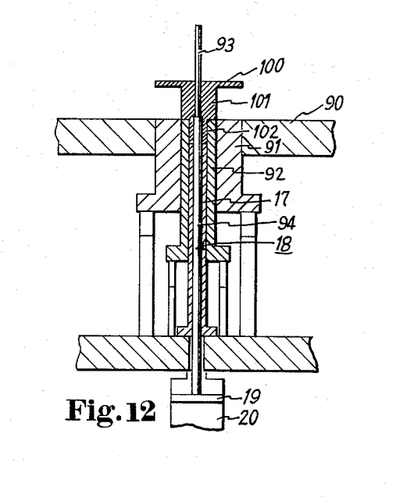
Figure 13:
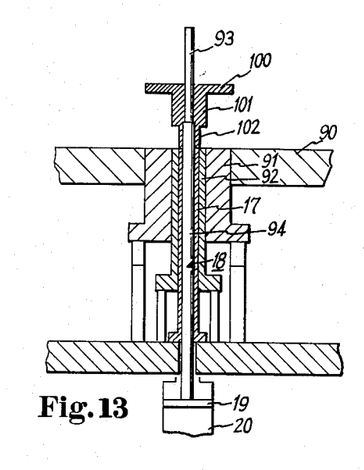
Figure 14:
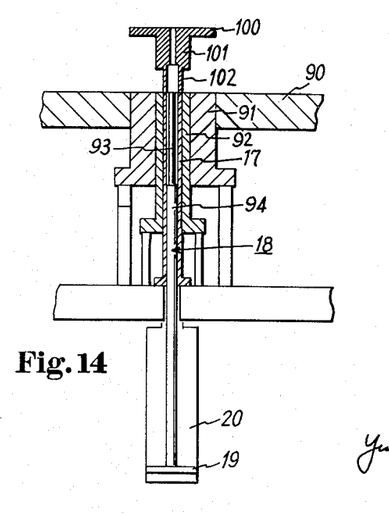

By means of the mechanism heretofore described, the stops for the intermediate die are now released so that the upper and intermediate platen and their dies can move down together, as shown in FIG. 12, to eject the portion 101 from the die 91. During this ejection it will be clear that the portion 101 is supported from below by the die 92. When the portion 101 has been completely ejected, as shown in FIG. 12, the stops for the platen containing the die 92 are released as above described so that all three platens may then move downwardly together to the position shown in FIG. 13. This brings about ejection of the portion 102 of the workpiece from the die 92. At this point then the core punch 18 is withdrawn as shown in FIG. 14, whereupon the workpiece has been completely ejected and may be removed from the press in any desired way. As soon as the workpiece has been removed from the machine, the hopper 96 again comes into position as shown in FIG. 5 and then the various platens and the dies contained therein are moved back up, telescoping again to the position shown in FIG. 6. This return movement of the dies may be accomplished pneumatically or hydraulically and of course as the various platens move back upwardly, the several wedge blocks are returned to their original position shown in FIG. 3 so as to be ready for a succeeding compacting operation.

It will be clear that the principles described herein may be utilized with any desired number of platens. If a single platen is used, the stop mechanism is probably used with that platen. If two or more platens are used, stop mechanisms as described herein must be provided for all but the uppermost platen, and the uppermost platen may be provided with a stop mechanism if desired.

While in the foregoing description reference has been made to an article having several different diameters, it will be clear that the invention is not limited to cylindrical objects. The stepped configurations may be oval, rectangular or of any desired shape.

It may be pointed out that floating platens per se are known. In the present application, however, the use of floating platens has been taken advantage of in connection with ejection in that the platens float downwardly during the compatcing step and are then forced downwardly during the ejection step so that the platens move downwardly both during compacing and ejection.

It will be understood that numerous modifications may be made without departing from the spirit of this invention and therefore no limitation not specifically set forth in the claims is intended.

What is claimed is:

1. A three platen compacting press for forming powdered material into an article having three portions of different diameters axially thereof, comprising a frame, three die platens floating mounted in said frame and each having a die providing for one of said different diameters, said dies being in telescoping relationship, a reciprocable punch and a fixed punch in axial alignment, means for forcing said reciprocable punch downwardly against powdered material in said dies to compact the same against said fixed punch, said die platens floating downwardly as the powdered material is compacted therein, spacing means between the upper and intermediate ones of said die platens, spacing means between the intermediate and lower ones of said die platens, stop means for at least said intermediate and lower die platens, said stop means being capable of taking the full load of the press, means operative upon completion of the compacting stroke of said reciprocable punch to force the upper die platen downwardly, means actuated by the first mentioned spacing means to release the first mentioned stop means when the upper surfaces of the dies of the upper and intermediate die platens are substantially flush, whereby said forcing means will then force said upper and intermediate die platens downwardly together, means actuated by the second mentioned spacing means to release the second mentioned stop means when the upper surfaces of the upper, intermediate and lower die platens are substantially flush, whereby said forcing means will then force all three of said die platens downwardly until the compacted article has been completely ejected, whereby each diameter of said article is supported from below during ejection, and means for returning all movable parts to their original positions.

2. A compacting press according to claim 1, wherein each of said spacing means and stop releasing means between two adjacent platens compirses two diametrically opposed spacer rods mounted on the upper of the two adjacent platens and two diametrically opposed stop rods secured to the lower of the two adjacent platens, said spacer rods and stop rods being respectively in axial alignment.

3. A structure according to claim 2, wherein means are provided to adjust said diametrically opposed spacer rods concurrently.

4. A structure according to claim 2, wherein means are provided to adjust said diametrically opposed stop rods concurrently.

5. A multi-platen compacting press for forming powdered material into an article having portions of different diameters axially thereof, comprising a frame, a plurality of die platens floatingly mounted in said frame and each having a die providing for one of said different diameters, said dies being in telescoping relationship, a reciprocable punch and a fixed punch in axial alignment, means for forcing said reciprocable punch downwardly against powdered material in said several dies to compact the same against said fixed punch, said die platens floating downwardly as the powdered material is compacted therein, spacing means between said several die platens, stop means for at least all but the upper one of said die platens, said stop means being capable of taking the full load of the press, means operative upon completion of the compacting stroke of said reciprocable punch to force the upper one of said die platens downwardly, means actuated by the spacing means between said upper one of said die platens and the next lower die platen to release the stop means of said next lower die platen when the upper surfaces of the dies of said upper and next lower die platens are substantially flush, whereby said forcing means will then force said upper and next lower die platens downwardly together, means actuated by the spacing means between said next lower and the second lower die platen to release the stop means for said second lower die platen when the upper surfaces of the dies of said upper, next lower and second lower die platens are substantially flush, and so on, until the compacted article has been ejected from all of said dies, whereby each diameter of said article is supported from below during its ejection, and means for returning all movable parts to their original positions.

6. A compacting press according to claim 5, wherein each of said spacing means and stop releasing means between two adjacent platens comprises two diametrically opposed spacer rods mounted on the upper of the two adjacent platens and two diametrically opposed stop rods secured to the lower of the two adjacent platens, said spacer rods and stop rods being respectively in axial alignment.

7. A structure according to claim 6, wherein means are provided to adjust said diametrically opposed spacer rods concurrently.

8. A structure according to claim 6, wherein means are provided to adjust said diametrically opposed stop rods concurrently.

References Cited by the Examiner
UNITED STATES PATENTS

| | | | |
|---|---|---|---|
| 2,338,491 | 1/44 | Cutler | 18—16.5 |
| 2,398,227 | 4/46 | Hubbert | 18—16.5 |
| 2,449,515 | 9/48 | Seelig | 18—59.6 |
| 2,509,783 | 5/50 | Richardson | 18—16.7 |
| 2,521,625 | 9/50 | Benge | 18—16 |
| 2,541,531 | 2/51 | Morris et al. | 18—59.6 |
| 2,583,249 | 1/52 | Baker et al. | 18—16 |

WILLIAM J. STEPHENSON, *Primary Examiner.*

MORRIS LIEBMAN, MICHAEL V. BRINDISI,
*Examiners.*